(12) United States Patent
Sharma et al.

(10) Patent No.: US 9,727,911 B2
(45) Date of Patent: Aug. 8, 2017

(54) SYSTEMS, METHOD AND COMPUTER-ACCESSIBLE MEDIUMS FOR PROVIDING SECURE PAPER TRANSACTIONS USING PAPER FIBER IDENTIFIERS

(71) Applicant: New York University, New York, NY (US)

(72) Inventors: Ashlesh Sharma, Redmond, WA (US); Lakshminarayanan Subramanian, New York, NY (US); Eric Brewer, Mill Valley, CA (US)

(73) Assignee: New York University, New York, NY (US)

( * ) Notice: Subject to any disclaimer, the term of this patent is extended or adjusted under 35 U.S.C. 154(b) by 1046 days.

(21) Appl. No.: 13/764,205

(22) Filed: Feb. 11, 2013

(65) Prior Publication Data

US 2013/0212027 A1 Aug. 15, 2013

Related U.S. Application Data

(60) Provisional application No. 61/597,559, filed on Feb. 10, 2012.

(51) Int. Cl.
*G06Q 40/00* (2012.01)
*G06Q 40/02* (2012.01)
(Continued)

(52) U.S. Cl.
CPC ......... *G06Q 40/02* (2013.01); *G06K 9/00483* (2013.01); *G06Q 20/30* (2013.01); *G07D 7/2033* (2013.01); *G06Q 20/108* (2013.01)

(58) Field of Classification Search
CPC ...... G06Q 40/02; G06Q 20/108; G06Q 20/30; G06Q 20/042; G07D 7/2033;
(Continued)

(56) References Cited

U.S. PATENT DOCUMENTS

| 7,251,347 | B2 | 7/2007 | Smith | |
|---|---|---|---|---|
| 2005/0199706 | A1* | 9/2005 | Beck | G06Q 20/105 235/380 |
| 2011/0109428 | A1* | 5/2011 | Cowburn | G06K 7/10762 340/5.8 |

FOREIGN PATENT DOCUMENTS

| WO | WO 03/030105 | | 4/2003 | |
|---|---|---|---|---|
| WO | WO2004/051917 | * | 6/2004 | ............... H04L 9/00 |

OTHER PUBLICATIONS

Salzman E. Metois, P. Yarin and J. R. Smith, "Fiberfingerprint identification," In Third Workshop on Automatic Identification (2002).

(Continued)

*Primary Examiner* — Minnah Seoh
(74) *Attorney, Agent, or Firm* — Andrews Kurth Kenyon LLP

(57) ABSTRACT

Exemplary systems, methods and computer-accessible mediums can receive information comprising a first speckle pattern(s) associated with a portion(s) of the paper. The information can be generated by an optical arrangement, and the first speckle pattern(s) can be compared with a second speckle pattern(s) to determine if a similarity measure based on local or global descriptors is of equal to a predetermined amount or within a predetermined range.

32 Claims, 7 Drawing Sheets

(51) Int. Cl.
*G06K 9/00* (2006.01)
*G06Q 20/30* (2012.01)
*G07D 7/2033* (2016.01)
*G06Q 20/10* (2012.01)

(58) Field of Classification Search
CPC .... G07D 7/2023; G07D 7/04; G06K 9/00483;
G06K 19/12; A61B 5/0059; H04L
2209/26; H04L 9/3263; G11B 23/283
See application file for complete search history.

(56) References Cited

OTHER PUBLICATIONS

Smith, Joshua et al., "Microstructure based indicia," In Proceedings of the 2nd Workshop on Automatic Identification Advanced Tech, p. 79-83, New York, NY, USA, 1999.
Baoshi Zhu, Jiankang Wu, and Mohan S. Kankan-halli, "Print signatures for document authentication," In ACM CCS '03, pp. 145-154, New York, NY, USA, 2003.
Ashlesh Sharma, Lakshminarayanan Subramanian, and Eric Brewerm "Paperspeckle Part I: Low Cost Paper Watermarking," Submitted, 2009.

\* cited by examiner

SYSTEMS, METHOD AND COMPUTER-ACCESSIBLE MEDIUMS FOR PROVIDING SECURE PAPER TRANSACTIONS USING PAPER FIBER IDENTIFIERS

CROSS-REFERENCE TO RELATED APPLICATION(S)

This application relates to and claims priority from U.S. Patent Application No. 61/597,539, filed on Feb. 10, 2012, the entire disclosure of which is incorporated herein by reference.

FIELD OF THE DISCLOSURE

Exemplary embodiments of the present disclosure relate generally to systems, method and computer-accessible mediums for identifying and authenticating a fibrous object, such as a piece of paper, based on the unique layout of the material fibers.

BACKGROUND OF THE DISCLOSURE

Mobile banking is a fast-growing industry in developing regions. Success stories like M-Pesa in Kenya and GCash in Philippines have shown that people in rural areas can be willing and eager to use mobile banking and money transfer schemes in their day to day lives. However, there have been problems in attempting to extend the services from simple peer-to-pee ("P2P") money transfers to broader financial services such as savings, remittances, deposits and withdrawals. Various reasons have impeded providing these wide range of services including the following exemplary factors:

First, the circle of trust between the client, agent, mobile network operator and bank needs to be well established. It can be important to provide secure financial transactions, which helps the client feel secure and comfortable enough to use the service. Also, providing secure transactions can lead to an increase in user adoption. Second, the transaction costs of these services should be inexpensive and within the reach of people in lower economic segments and areas. A recent survey across 16 different mobile banking services (CGAP '10), showed that branchless banking is currently only 19% cheaper than traditional banking, while the income gap between developed nations and developing nations can be far greater than 19%.

Third, new business models for branchless banking may need to be pursued in order to provide the clients with a wide range of services, from P2P transfers, savings, deposits and withdrawals, to loans, remittances and insurances. In order to provide such services, new business models that make use of innovative technological solutions, lower the cost barrier, and work with existing agents and service providers (e.g., mobile network operators "MNOs" and/or banks) may be needed.

While there exists watermarking techniques, these techniques tend to be expensive and/or overly complicated. Two prior paper watermarking techniques include: (a) fiber fingerprinting by Metois et al. (N. Salzman E. Metois, P. Yarin and J. R. Smith. Fiberfingerprint identification. In Third Workshop on Automatic Identification, 2002) and Smith (Joshua R. Smith and Andrew V. Sutherland. Microstructure based indicia. In Proceedings of the Second Workshop on Automatic Identification Advanced Technologies, pages 79-83, New York, N.Y., USA, 1999. ACM), and (b) print signatures by Zhu et al. (Baoshi Zhu, Jiankang Wu, and Mohan S. Kankanhalli. Print signatures for document authentication. In ACM CCS '03, pages 145-154, New York, N.Y., USA, 2003). See also, Ashlesh Sharma, Lakshminarayanan Subramanian, and Eric Brewer. Paperspeckle Part I: Low Cost Paper Watermarking. Submitted, 2009. However, both of the above watermarking techniques are expensive to implement, are overly complicated, and have not been readily adopted.

Thus, it may be beneficial to provide exemplary systems, methods and computer-accessible mediums for facilitating paper watermarking that can addresses the above problems, provide a way to introduce further business models, improve existing market models and lower the overall cost of operation of extending the financial services lower economic individuals and areas.

SUMMARY OF EXEMPLARY EMBODIMENTS

To that end, exemplary embodiments of the present disclosure which include apparatus, systems, methods, and computer-accessible mediums for authenticating paper instruments, e.g., for financial transactions, can be provided.

According to one exemplary embodiment of the present disclosure, exemplary systems, methods and computer-accessible mediums can verify or authenticate a portion of a paper or contents thereof by receiving information comprising a first speckle pattern(s) associated with a portion(s) of the paper, wherein the information can be generated by an optical arrangement. The first speckle pattern(s) can be compared with a second speckle pattern(s) to determine if a similarity measure based on local or global descriptors is of equal to a predetermined amount or within a predetermined range.

In some exemplary embodiments, the system can be a handheld computing device or a cell-phone attached to the optical arrangement. The optical arrangement can include a microscope. The second speckle pattern(s) can be generated from the paper. In some exemplary embodiments, the information can further include a hash of the contents of the paper, and the comparing procedure can compare the first speckle pattern(s) with the second, speckle pattern(s) and the hash. The obtaining procedure can be performed by extracting the first speckle pattern(s) from a user identity region of the paper, and the user identity of the user that owns the paper can be can be authenticated based on the information by comparing the first speckle pattern(s) with the second speckle pattern(s) from the user identity region to effectuate the determination. In certain exemplary embodiments, the user identity region can be a set of predetermined regions of a printed, an embedded, a written, a stained or a pasted user identity. The identity can include or more fingerprints or biometric data. In some exemplary embodiments, the contents can represent the material present on the paper.

According to another exemplary embodiment can be an article of manufacture for conducting or authenticating a banking procedure including a speckled paper receipt having a fixed denomination or a variable denomination received from a party as part of a transaction, and/or a a computer hardware arrangement associated with the speckled paper receipt. In some exemplary embodiments, the speckled paper receipt can contain a hash value(s) of data of the transaction, a speckle image, a low dimensional representation(s) of the speckle pattern, and/or a receipt serial number(s). The speckle paper receipt can be authenticated by comparing the hash value(s) and the low dimensional representation(s) of the fixed denomination receipt with a stored data of hash values and stored data of low dimensional representations based on a similarity measure of local or global descriptors, or a Euclidean distance.

In certain exemplary embodiments, the transaction can be performed upon receipt of the fixed denomination receipt sent from a bank to a shopkeeper(s) or agent(s). The low dimensional representation can be transmitted to a trusted authority or a ban using a mobile phone or a further online portal, to verify an account balance. A denomination of the variable denomination speckled paper receipt can be modified by a shopkeeper or an agent, and a low dimensional representation of the modified denomination can be generated. The speckle image and the hash value can be encrypted using a private key of a trusted authority, and the speckle image and hash value can be decrypted by applying a public key of the trusted authority. In some exemplary embodiments, the fixed denomination receipt and/or the variable denomination receipt can be part of a passbook that can comprise a plurality of entries for fixed or variable denomination transactions.

In another exemplary embodiment of the present disclosure can be a method of conducting or authenticating remittances with an agent, receiver, sender and a trusted authority, method which can include receiving, by the receiver, a speckle voucher and a speckle hash. The receiver can transmit to the sender, the speckle hash. The sender can transmit to the trusted authority, the speckle hash and an amount to be deposited. The trusted authority can transmit to the sender, a particular number. The sender can transmit to the receiver, the number. The receiver can transmit to the agent, the number, the speckle hash and the speckle voucher. The particular number, the speckle hash and the speckle voucher, can be authenticated and a particular amount can be deposited.

In some exemplary embodiments, the speckle voucher is a paper, and a speckle pattern(s) can be extracted from a portion of the paper. The particular number can be encrypted, and the encryption can be a function of the speckle hash, the amount and a transaction serial number. The authentication procedure can include decrypting the particular number using a public key of the trusted authority, and comparing the decrypted information to information on the speckle voucher. The information regarding the speckle voucher can include the speckle hash and a speckle pattern, and the comparison procedure can be based on a similarity measure.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTIONS OF THE DRAWINGS

Further objects, features and advantages of the present disclosure will become apparent from the following detailed description taken in conjunction with the accompanying Figures showing illustrative embodiments of the present disclosure, in which.

Figure 1:
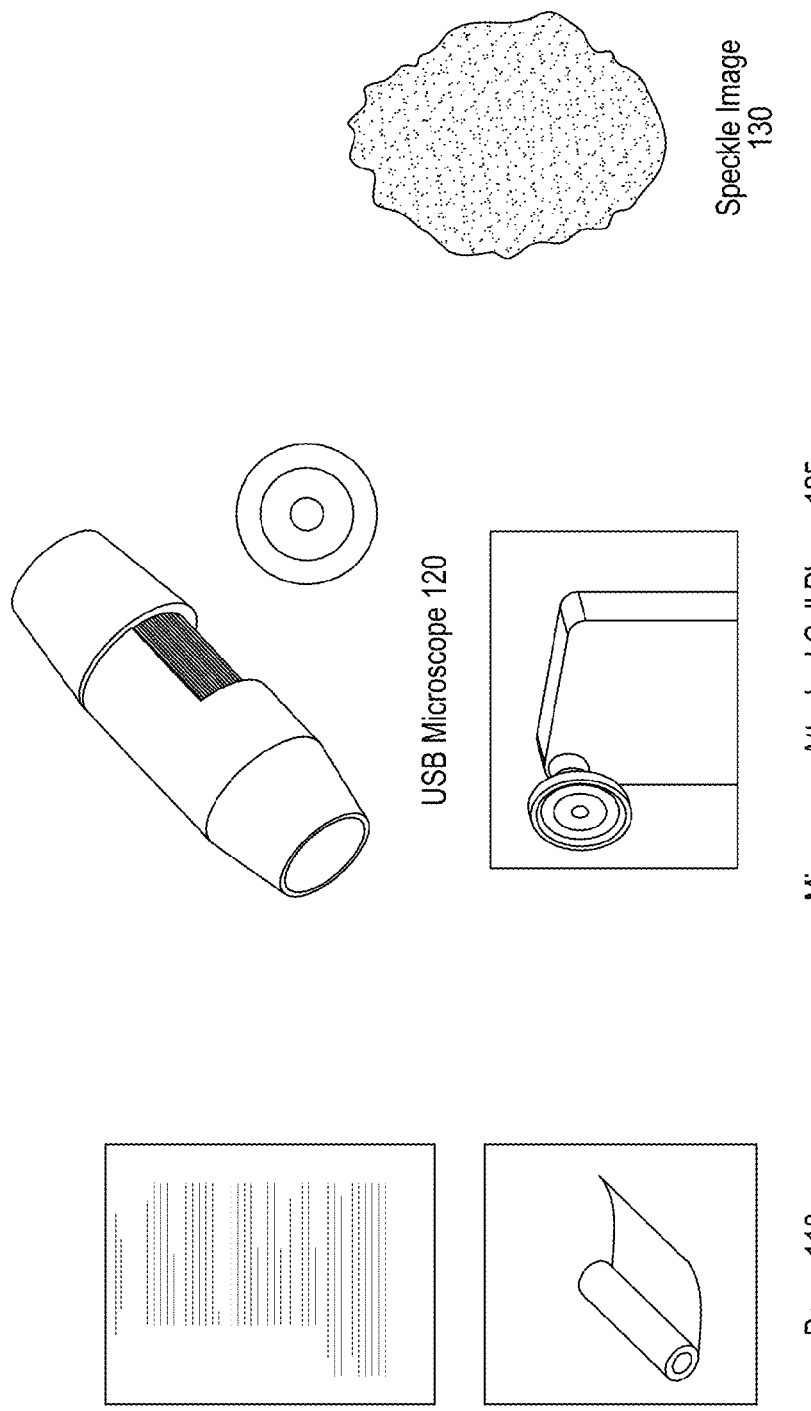
FIG. 1 is an illustration of exemplary components that can be incorporated into the exemplary systems, methods and computer-accessible mediums according to exemplary embodiments of the present disclosure.

Throughout the drawings, the same reference numerals and characters, unless otherwise stated, can be used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures or the appended claims.

DETAILED DESCRIPTION OF EXEMPLARY EMBODIMENTS

Exemplary embodiments of the present disclosure present various exemplary systems, methods and computer-accessible mediums for facilitating, e.g., banking (e.g., rural banking) based on uniquely identifying physical papers, herein referred to as "PaperSpeckle." Exemplary embodiments of the systems, methods and computer-accessible mediums according to the present disclosure can be implemented on, e.g., savings, branchless banking, and remittances, can introduce the concept of "on/off cash", and explain how any paper can be turned into on demand cash. Further, any number of other exemplary applications, implementations and/or uses can be utilized according to other exemplary embodiments of the present disclosure.

For example, FIG. 1 shows exemplary components which can be used in or with the exemplary systems, methods and computer-accessible mediums to perform, e.g., a paper authentication at every node in an exemplary supply chain system. PaperSpeckle can use a simple low-cost sensor device for authentication. An exemplary sensor device can include, for example, a microscope 120, a light sensor, an optics attachment to a camera device 125, or any, number of other exemplary devices capable of reading or otherwise identifying a unique pattern within the target object. Exemplary embodiments of the present disclosure can include a paper watermarking mechanism which can include and/or utilize a watermark paper 110, and that can offer a tamper-resistant based authentication and identification of paper.

In one exemplary embodiment, a speckle pattern and/or image 130 can include a random intensity pattern produced by the mutual interference of coherent wavefronts that can be subject to phase differences or intensity fluctuations. These exemplary speckles can be caused by rays scattering from different parts of the illuminated area. At the screen, these rays can have different optical path lengths, and therefore the rays can interfere and result in speckles. Exemplary embodiments can use an exemplary sensor device, such as a consumer grade microscope with inbuilt LED's and 10×-200× magnification, to extract this exemplary speckle pattern 130 from the paper 110.

It can be difficult to observe and digitally capture speckles from a plain (e.g., white) sheet of paper. Therefore, the exemplary systems, methods and computer-accessible mediums can include and/or utilize a dark colored marker pen that, can be used to stain a small region of the paper (e.g., approximately 2 mm). This can produce an arbitrary contour ink "blob". The dark background, which can be obtained from staining, can assist to distinguish bright and dark regions of the speckle, as compared to a light background. Due to arbitrary contours, there can be two forms of "random" signatures: (a) a random speckle within the strained region; and (b) an arbitrary shaped contour of strained region. This combination of two random patterns can be hard to counterfeit.

After digitally capturing the speckles using, for example, the microscope 120, standard image processing algorithms and/or procedures can be used to extract feature information of all the speckle images stored in the repository. For matching two speckle images (e.g., "a" and "b"), according to certain exemplary embodiments of the present disclosure, it is possible to use standard image processing algorithms, and match feature information of "a" with feature information of "b." For example, if the match is greater than a certain threshold, then speckle "a" can be equal to speckle "b."

The exemplary properties of PaperSpeckle that can make it suitable for, e.g., authentication purposes in developing-region environments can include:

i) Low cost: At each point or node in the supply chain, the equipment used to authenticate goods can include a paper Tag which can be attached to the supply item(s), and a low cost sensor device, such as a microscope.

ii) Portable: Both the paper and sensor can be both portable, so this can fit the ad-hoc nature of supply chain systems in developing regions.

iii) Tamper-resistant: In developing regions, paper can be poorly maintained due to bad storage environments, damage due to rain, crumpling of watermarked area and aging of paper. However, various components, systems, elements, etc. according to the exemplary embodiments of the present disclosure have been stress tested and shown to be robust in the wake of extreme conditions, such as: (a) crumpling around the watermarking region; (b) soaking the paper water; (c) extracting the signature under different lighting conditions; and/or (d) aging of paper across time.

Figure 2:
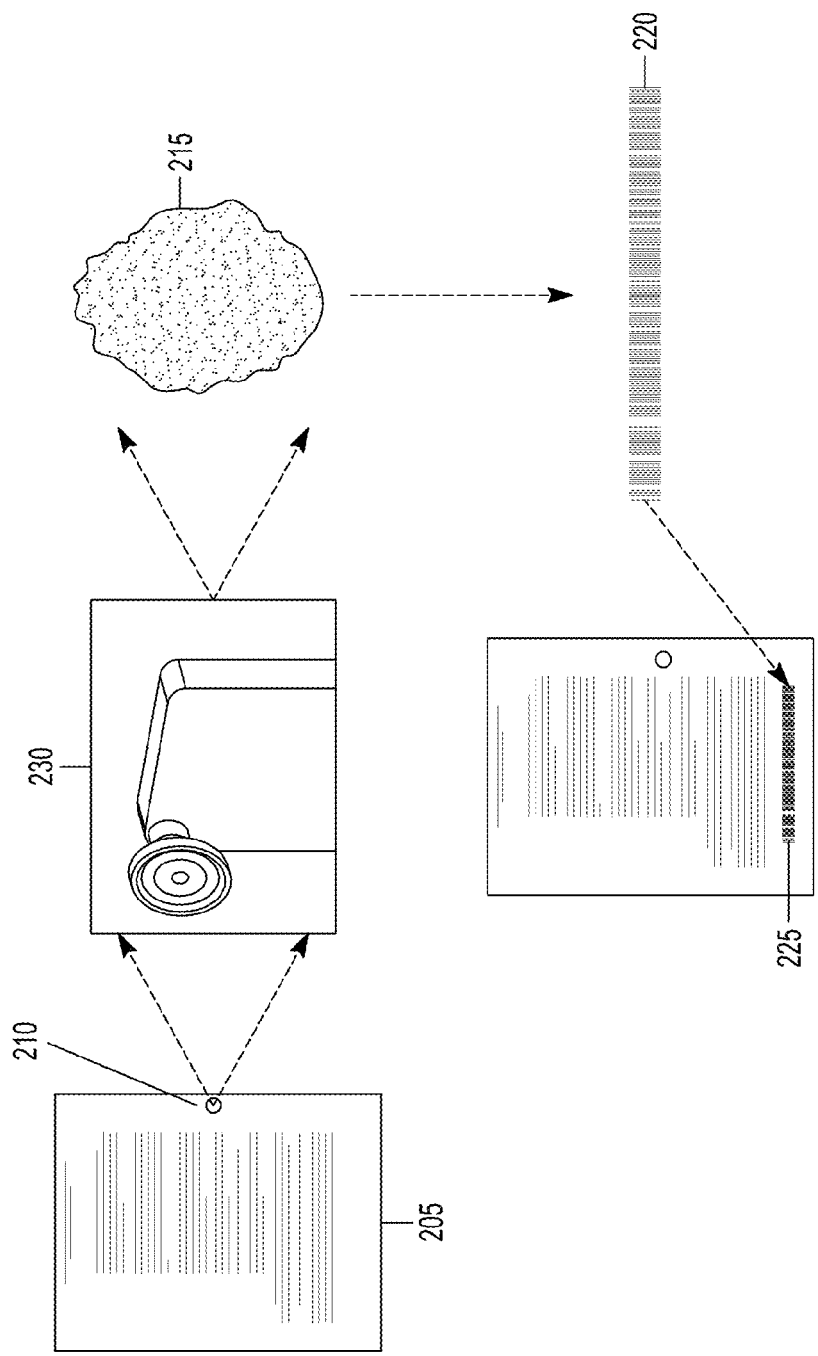
FIG. 2 is a diagram of an exemplary self-verification procedure according to exemplary embodiments of the present disclosure.

An exemplary embodiment of the present disclosure can include an exemplary procedure to self-verify a piece of paper. (See e.g., exemplary diagram of FIG. 2). For example, as shown in FIG. 2, given a piece of paper 205, a predetermined region 210 can be marked and a microscopic image can be extracted from that region using the exemplary embodiments of the system, method and computer-accessible medium according to the present disclosure. Using such exemplary system, method and computer-accessible medium, unique features 215 can then be extracted of the image and a compact code can be generated 220. This compact code can then be written or embedded on to the same piece of paper 205 as a 2D barcode 225. To verify this paper 205, the predetermined region can be read using, for example the microscope 230, and the image can be processed to obtain the compact code. The generated compact code 220 and the compact code written on the paper 205 can be compared to find a match, or no match, e.g., using the exemplary system, method and/or computer-accessible medium. For example if the Euclidean distance between the two codes is more than a threshold, then it can be considered a match, else it may not be considered a match.

Given the basic verification procedure above, the system, method and/or computer-accessible medium according to exemplary embodiments of the present disclosure can also verify the authenticity of the contents of the paper. This exemplary process/procedure can include the following, e.g.: (1) The compact code generated can be combined with the hash of the content of the paper and the string consisting of the compact code and hash can now be embedded on to the paper as a 2D barcode; (2) To verify the authenticity of the paper and its contents, exemplary embodiments can read the predetermined region using, for example, a microscope, and compute the compact code; (3) A string can be generated by concatenating the compact code and the hash of the paper contents; (4) The 2D barcode can then be read and the compact code can then be compared with the generated compact code as in the case of basic verification procedure; (5) The hash present in the 2D barcode can be compared to the generated hash; and (6) If the hashes match, then the contents of the paper can be the same, else the contents can be different.

In other exemplary embodiments of the present disclosure, with the use of the exemplary system, method and/or computer-accessible medium, the identity of the user can be combined with the compact code to provide a secure way to link the user with the paper. For example, the paper can contain a user identity such as a fingerprint, and exemplary embodiments can extract the speckle from a predetermined position within the fingerprint. The features and compact code extracted from this region can then tie the fingerprint to that specific paper. The fingerprint can be verified as per the standard biometric verification process, and the compact code can be verified as per the basic verification process discussed above.

Another exemplary method according to the exemplary embodiment of the present disclosure to tie in the user-identity with the compact code can be to combine the user identity information, such as, e.g., feature vectors of the fingerprints or iris scan, with the compact code, and embed the concatenated string as the 2D barcode on the paper. The barcode can provide not only the authenticity of the paper, but the identity of the user.

System, method and computer-accessible medium according to other exemplary embodiments can also implement, e.g., Public Key Infrastructure ("PKI") based techniques that can be used in conjunction with the exemplary verification procedures. A trusted authority can sign the compact codes with a secret key, and an agent can decrypt the signed code with the public key of the trusted authority, thereby ensuring that the key was indeed signed by the trusted authority.

System, method and computer-accessible medium according to exemplary embodiments of the present disclosure can be used for a number of paper-based financial transactions to provide security and accountability. Exemplary types of transactions and exemplary security properties can include, e.g.:

Savings: In Savings, exemplary embodiments can have a fixed receipt scheme, variable receipt scheme and passbook scheme.

Remittances: Exemplary embodiments can present a new model for conducting remittances, and show why the exemplary model can provide better security guarantees and scalability than the existing solutions.

Branchless banking: A general branchless banking model can be presented that can co-exist with the mobile banking schemes currently in the market.

Paper to cash: Exemplary embodiments can use PaperSpeckle for enabling "smart banknotes" or "on/off cash".

Exemplary embodiments of a savings scheme can include, e.g., a "fixed receipt scheme". First, the exemplary scheme can include a registration; for example, a farmer ("F") may prefer to open a bank account and conduct financial transactions. The farmer can go to a shopkeeper ("S") and notify him that he wants to open a bank account. The shopkeeper can provide the farmer with an ID, which can consist of a speckle $S_i$, speckle hash $H_{id}$, a unique account number $A_{id}$, name F and a hash $N_{id}$, where $N_{id}$ can be a hash of $H_{id}$ and $A_{id}$.

Figure 3:
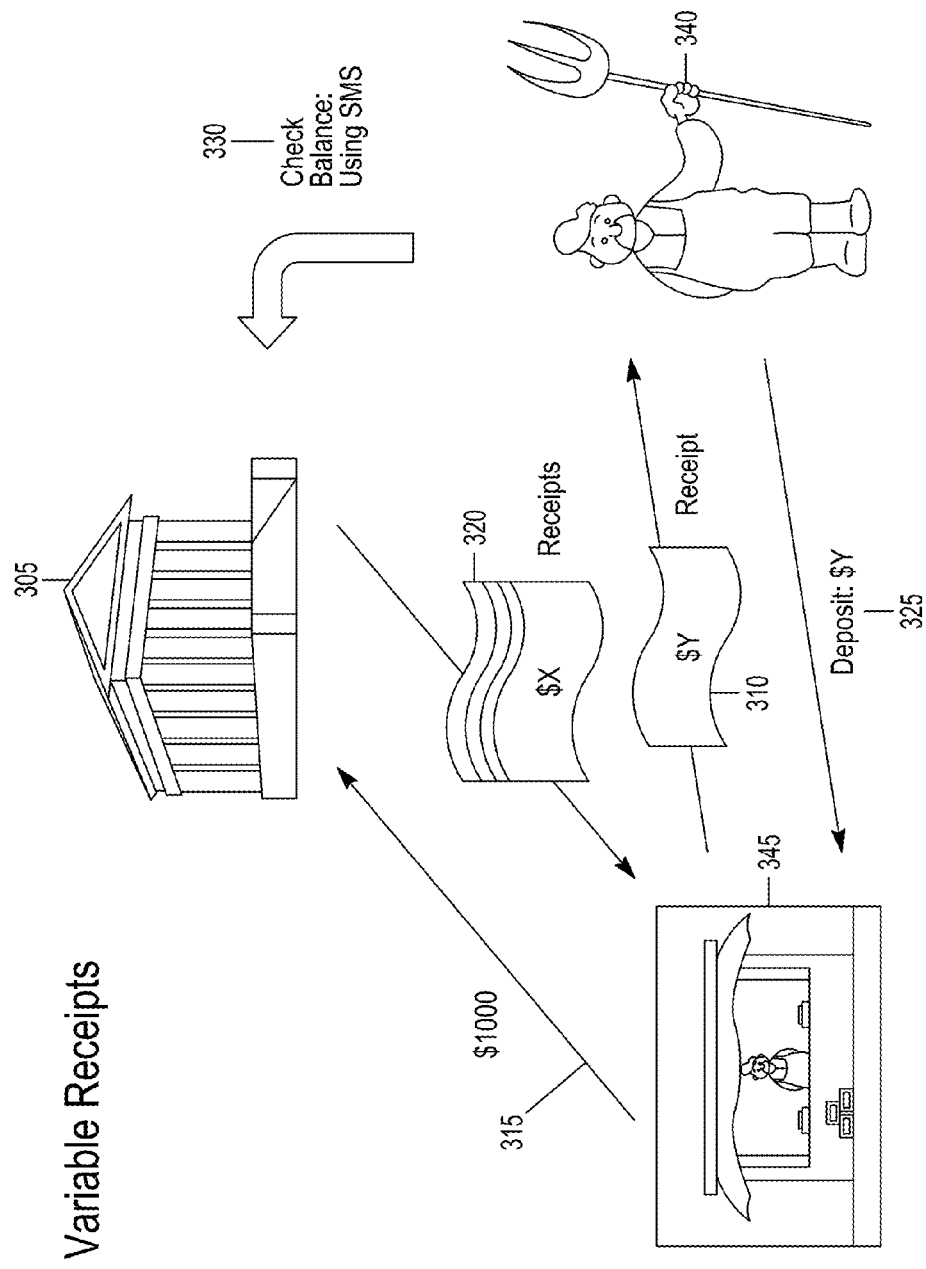
FIG. 3 is a diagram of an exemplary fixed receipt scheme for secure branchless banking according to exemplary embodiments of the present disclosure.

Exemplary embodiments of the present disclosure can also include a fixed receipt scheme (e.g., procedure A) where a bank ("B") can give the shopkeeper PaperSpeckle ("PS") receipts ("R") of fixed denomination (See e.g., exemplary diagram of FIG. 3). (B→S: R). The receipt R can consist of speckle S, speckle hash H, receipt code (or number) C and hash N, where N=f (H,V,C) can be the hash of the denomination value V, speckle hash H and the receipt code C. To check if the receipt is genuine the procedure can be as follows. The speckle can be read and processed using a mobile phone to obtain speckle hash $H_0$. If H=H, then the receipt can be genuine, else it can be a counterfeit. To verify if the receipt is of the same denomination value V, the exemplary procedure can be as follows. The speckle hash H, value V and code C can be keyed in to the mobile phone and a hash $N_0$ can be obtained. If $N_0$=N, then the receipt can be of the same denomination V and code C, else the value or the code has been tampered.

Next, e.g., in procedure B, the farmer 340 can deposit a certain amount ("Am") to his bank account 305. (F→S: Am). He can give the shopkeeper 345 the amount Am 325 and the shopkeeper can give the receipts $R_i, \ldots, R_j$ to the farmer, where the sum of the denomination values of the receipts can be equal to the amount Am ($V_i+ \ldots +V_j$=Am) 310. (S→F: $R_i, \ldots, R_j$). The farmer has a set of receipts whose value can be equal to the amount he deposited with the shopkeeper.

The farmer now has the physical confirmation that he has deposited amount Am with the shopkeeper. The shopkeeper can send a short message service ("SMS") to the bank with the following details: account number $A_{id}$ of the farmer and speckle hashes Hi . . . , $H_j$. (S→B: $A_{id}$, $H_i, \ldots, H_j$) 315 (procedure C). The bank sends back the amount de posited Am and the hashes $N_i, \ldots, N_j$. (B→S: Ni, . . . , Nj) 320. The shopkeeper can check the amount and the hashes. If they match, then the bank has received the correct account number of the farmer and the correct speckle hashes. Otherwise there was either a man-in-the-middle attack or the SMS was dropped, in which case the shopkeeper has to repeatedly send the farmer's account number and speckle hashes, until he receives the correct response (amount and the hashes Ni, . . . , Nj).

The farmer can verify his/her bank balance by sending the hash of his ID (e.g., as SMS) to the bank. (F→B: SMS(HID) 330 (procedure D). The bank can send back to the farmer, the current balance in his account. (B→F: Balance).

For withdrawal, the protocol may only need to change in procedure B, where the shopkeeper hands over the money to the farmer.

Exemplary embodiments of the system, method and/or computer accessible medium can also provide a check balance feature/procedure. For example, if the farmer does not have a cell-phone, then he can still be sure that the money is safely deposited in the bank, as he has the physical receipts which authenticate the transaction. The farmer can take the receipts to any shopkeeper or a bank branch to check if the transaction was conducted and the amount specified in the receipts were deposited to the account. For example, the farmer can go to a nearby shopkeeper and provide his receipt and ID. The shopkeeper can use a cell-phone, and a microscope, to scan the speckle and confirm the speckle hash of the ID. If the speckle hash of the ID matches the hash computed on the cell-phone, then the ID card can be genuine, otherwise it can be a counterfeit. If the ID card is genuine, the shopkeeper can go ahead and check the receipt. The exemplary procedure to check the receipt can be as follows. The shopkeeper can scan the speckle on the receipt using a mobile phone to obtain speckle hash $H_0$. If $H_0$=H, then the receipt can be genuine, otherwise it can be a counterfeit. To verify if the receipt is of the same denomination value V the exemplary procedure can be as follows. The speckle hash H, value V and code C can be keyed in to the mobile phone and a hash $N_0$ can be obtained. If $N_0$=N, then the receipt can be of the same denomination V and code C, otherwise the value or the code has been tampered. The shopkeeper can send N using SMS the bank. The bank can reply whether the transaction was committed or not. Similarly, the farmer's bank balance can be checked by sending the hash of ID (e.g., using SMS) to the bank. The bank can reply back with the current balance in the farmer's account.

During the exemplary registration process and during each transaction process, the ability to authenticate the receipts in a completely offline manner (e.g., without any sort of connectivity) can be a huge advantage over the existing systems. In addition, for any subsequent checks, such as to check for current balance or to check whether a transaction was committed, the authenticity of the receipt, and ID card, can be checked in an offline manner without resorting to any sort of online communication.

Further, the exemplary systems, methods and computer-accessible mediums according to other exemplary embodiments of the present disclosure can utilize a variable receipt scheme where the shopkeeper has the ability to print the denomination value on the receipts. This can provide the shopkeeper an increased flexibility in transactions, and can also reduce the number of receipts per transaction. The exemplary registration process can follow the same or similar exemplary procedure as provided in the fixed deposit scheme.

First, e.g., the bank B can provide the shopkeeper S PaperSpeckle PS receipts R (B→S: R), where each receipt R can consist of speckle S, speckle hash H, receipt code (or number) C. The shopkeeper can print or write the denomination of each receipt.

Next, the farmer F may want to deposit certain amount Am to his bank account and gives the shopkeeper the amount Am. (F→S: Am). The shopkeeper can write or print a receipt with value V=Am and use a cell-phone to compute a hash N, where N=(H, V, C, $N_{id}$). The shopkeeper can print N on the receipt and hand it over to the farmer. (S→F: R). The receipt R can be authenticated in an offline manner and the information in the receipt can be tamper-resistant. If the information in the receipt is tampered, it can be detectable (e.g., using a cell-phone) since N can be a function of speckle hash H, value V and hash of the farmer's id $N_{id}$ The receipt can provide the farmer with a guarantee that the amount Am can be deposited to his account.

Then, the shopkeeper can send a short message service SMS to the bank with the following exemplary details: account number $A_{id}$ of the farmer, speckle hash of the receipt H and the amount Am. (S→B: Aid, H, Am). The bank can send back the amount deposited Am and the hash N, (B→S: N). The shopkeeper can check the amount and the hash. If they match, then the bank has received the correct information. Otherwise, there was either a man-in-the-middle attack or the SMS was dropped, in which case he shopkeeper has to repeatedly send Aid, H and Am, until he receives the correct response (e.g., amount and the hash N).

The hash N can be computed by the bank (e.g., using a computer) since farmer, can know the $N_{id}$. Therefore, there can be no man-in-the-middle shopkeeper has an accomplice, then he has to only guess $N_{id}$ which is highly improbable. Therefore it would likely prevent a man-in-the-middle attack from the shopkeeper's side. If the farmer has an accomplice, then the man-in-the-middle attack can be thwarted by including some sort of shopkeeper's id into computing N. That way only, the bank would know both $N_{id}$ and shopkeeper's id, thereby thwarting any sort of man-in-the-middle attack.

Next, the farmer can check the bank balance by sending the hash of his ID (as SMS) to the bank. (F→B: SMS(HID)). The bank can send back to the farmer, the current balance in his account. (B→F: Balance).

For withdrawal, the protocol only changes in procedure 310, where the shopkeeper can hand over the money to the farmer.

When checking the balance (e.g., if the farmer does not have a cell-phone), then he can still be sure that the money is safely deposited in the bank, as he has the physical receipt which can authenticate the transaction. The farmer can take the receipt to any shopkeeper or a bank branch to check if the transaction was conducted and to determine if the amount specified in the receipt was deposited to the account. For example, the farmer can go to a nearby shopkeeper and provide his receipt and ID. The shopkeeper can use a cell-phone, and a microscope, to scan the speckle and confirm the speckle hash of the ID. If the speckle hash of the ID matches the hash computed on the cell-phone, then the ID card is genuine, otherwise it is a counterfeit. If the ID card is genuine, the shopkeeper can go ahead and check the receipt. The exemplary procedure to check the receipt can be as follows. The shopkeeper can scan the speckle on the receipt using a mobile phone to obtain speckle hash $H_0$. If $H_0=H$, then the receipt can be genuine, otherwise is a counterfeit. To verify the authenticity of the information in the receipt, the shopkeeper can enter H, V and $N_{id}$ on the phone to obtain the hash $N_0$. If $N_0=N$, then the receipt can be of the same denomination V, receipt code C and the transaction was conducted by the farmer with the specified $N_{id}$, otherwise the information is tampered. The shopkeeper can send N using SMS to the bank. The bank can reply whether the transaction was committed or not. Similarly, the farmer's bank balance can be checked by sending the hash of ID e.g., (using SMS) to the bank. The bank can reply back with the current balance in the farmer's account.

The exemplary advantages of variable receipt scheme over the fixed receipt scheme can be as follows:

Flexible: The shopkeeper has the choice of printing the denomination on each receipt. This helps in reducing the number of receipts per transaction compared to the fixed receipt scheme.

Secure: The shopkeeper has the ability to make the transaction secure by incorporating more elements into the hash. For example, date and time could be included in the hash N. Now apart from the receipt being self-verifiable, the exact data and time of the transaction can be obtained.

Similarly to the exemplary fixed receipt scheme, the receipts can be authenticated and verified in a completely offline manner.

Figure 4:
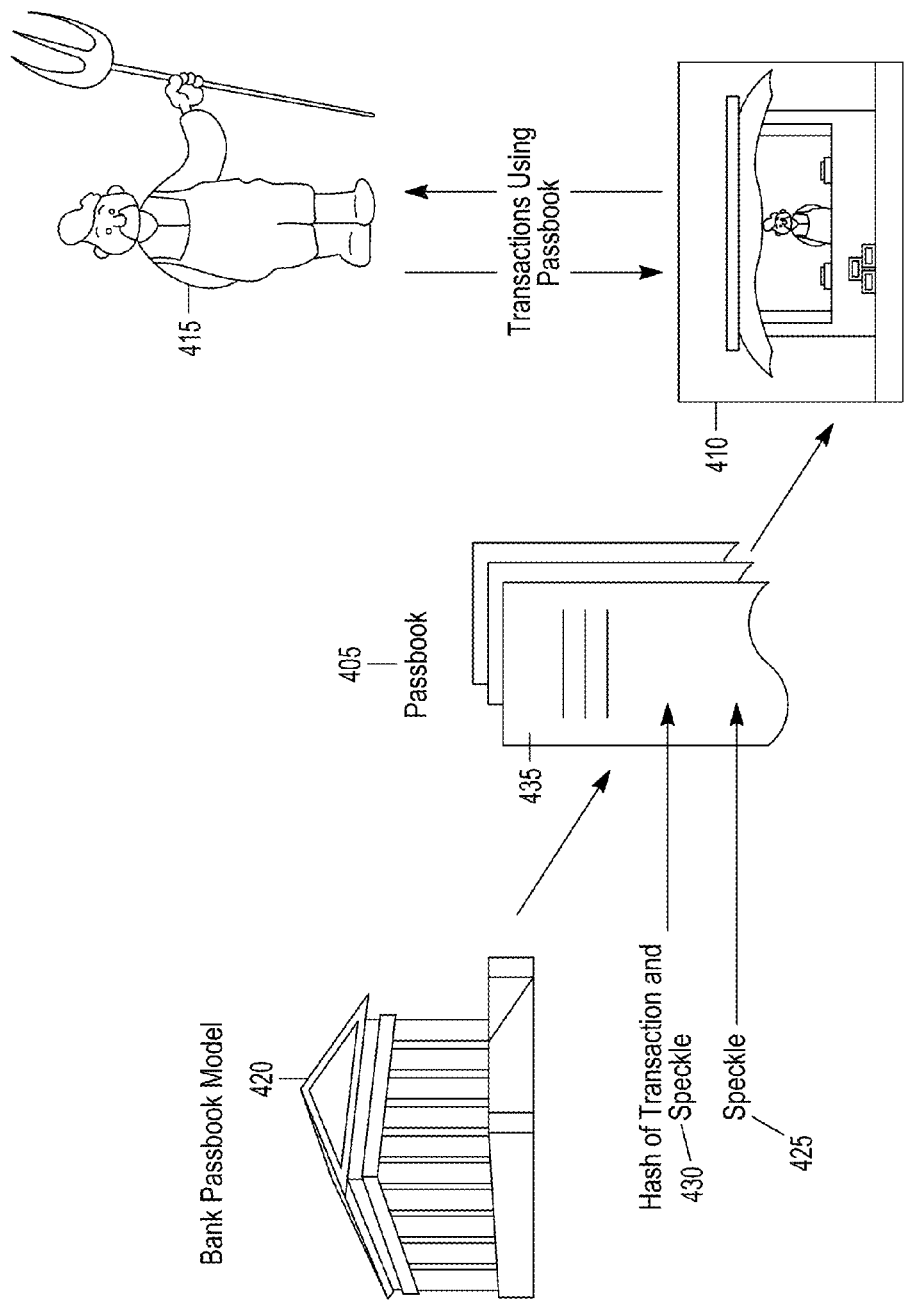
FIG. 4 is a diagram of an exemplary passbook procedure according to exemplary embodiments of the present disclosure.

According to another exemplary embodiment of the present disclosure, a passbook scheme can be provided. (See e.g., exemplary diagram of FIG. 4) For example, as shown in FIG. 4, the bank 420 can give a set of passbooks 405 to shopkeepers 410. Each entry 435 (e.g., a row) in a passbook can be like a receipt. Each entry 435 can consist of fields such as, speckle S 425, speckle hash H 430, random code C, denomination value V, hash N and date/time. The denomination value V, hash N and date/time can be blank and can be filled after the transaction is completed.

Each entry in the passbook can correspond to a transaction as per the variable receipt scheme. For example, when the farmer 415 approaches the shopkeeper to conduct a transaction, the shopkeeper can give an ID card and a passbook to the farmer. For subsequent transactions, the passbook can be used to make entries and serves as a variable receipt. Similarly to the exemplary variable receipt scheme, the farmer has physical entries which can be authenticated and verified in a completely offline manner.

Figure 5:
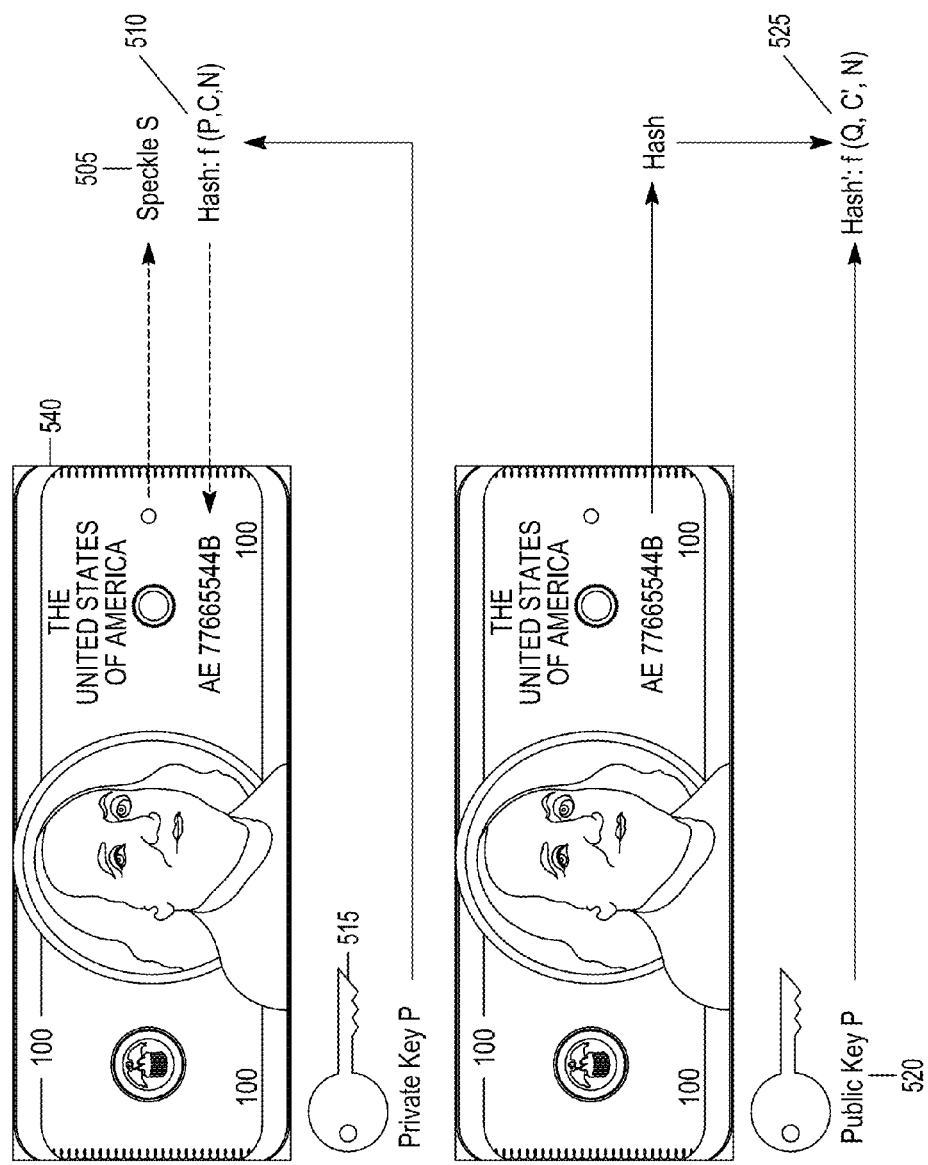
FIG. 5 is a diagram of an exemplary anti-counterfeiting procedure according to exemplary embodiments of the present disclosure.

Exemplary Savings schemes, as well as an anti-counterfeiting scheme can be implemented using public-private-key infrastructure. (See e.g., FIG. 5). For example, in procedure A of the exemplary fixed receipt scheme, variable receipt scheme, and anti counterfeiting scheme, a cash bill 540 can have a speckle S 505 and its corresponding hash H 510. This can be signed by the bank using its private key Q 515. Then, during the authentication process, the shopkeeper can decrypt the hash using the bank's public key P 520. This can assure the shopkeeper and the farmer that cash bill 540 is verified by the bank. Similarly, as in the pass-book scheme, a hash 525 in each of the entries can be signed by the bank's private key Q 515, and then during the transaction and authentication process, this hash can be decrypted using bank's public key P 520. This can assure that each entry was created by the bank.

Figure 6:
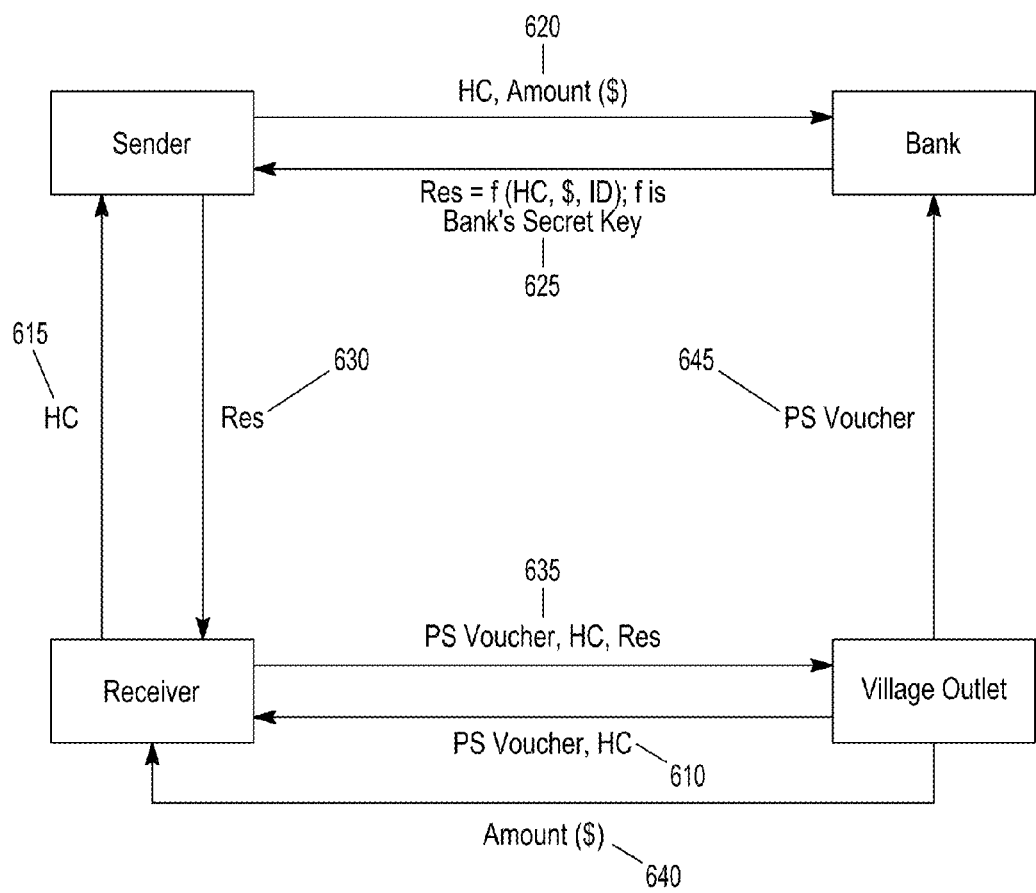
FIG. 6 is a diagram of an exemplary remittance procedure according to exemplary embodiments of the present disclosure.

Systems, methods and computer-accessible medium according to certain exemplary embodiment can also provide and/or utilize remittance services in a secure, low cost manner. The basic remittance model (See e.g., FIG. 6) using one or more exemplary embodiments is described as follows.

For example, let sender $S_{en}$ is the person who wants to send certain amount of money to the receiver Rec in the village. The bank can send PaperSpeckle checkbooks, or vouchers, to the shopkeeper (e.g., through the mail). First, the sender wants to send certain amount Am to the receiver. The receiver can go to a shopkeeper and collect the PaperSpeckle voucher ("PS voucher"). ($S_{en}$→Rec: PS voucher) (610) (procedure I). The PS voucher can have a speckle pattern S and a corresponding speckle hash H. The shopkeeper or farmer, or anyone who has access to the Paper-Speckle application, can verify whether the voucher is genuine or not. The speckle S can be read using a cell-phone and the hash $H_0$ can be computed. If $H=H_0$, then the voucher can be genuine, otherwise it can be a counterfeit.

Next, the receiver can call the sender and tells him the hash H. (Rec→Sen: H) (615) (procedure II). Here a lot of variations can be performed. If it is a problem for the receiver to send H each time, a permanent account number of the receiver can be given by the shopkeeper. The receiver can tell this account number to the sender only once, and the sender can deposit money by referring to the account number (explained below in Step 3).

Third, the sender can deposit the amount in his local bank and provide the bank with the hash H (620). The bank can sign the hash H, amount Am and transaction details such as ID (e.g., name) of the receiver, with its private key. (Sen→B: H, Am). Transaction details could also include the ID of the sender, date/time etc. The resulting number after the bank signs the message with its private key can be the Response number (Res=f (H, Am, ID)). (B→Sen: Res=f (H, Am, ID)) (625). (Procedure III)

Fourth, the sender can send the Res to the receiver. (Sen→Rec: Res) (Procedure IV). The Res can be sent to the receiver by making a telephone call or by sending a SMS (630).

When the receiver has the Res, he/she can go to any shopkeeper with the PS voucher and Res to withdraw cash (635). (Rec→S: PS voucher, Res)(Procedure V) The exemplary procedure can be as follows. The shopkeeper uses the PaperSpeckle application on his cell phone to read the speckle S on the PS voucher and compute the hash $H_0$. If $H_0$=H, then the voucher can be genuine, otherwise it can be a counterfeit. If the voucher is genuine, then the bank's public key can be used to decrypt Res to obtain H, Am and ID of the receiver or other transaction details. If Res cannot be decrypted using bank's public key, then the transaction can be aborted. If H=$H_0$ and ID in the decrypted Res matches the ID of the receiver, then the shopkeeper can hand amount Am to the receiver, else the shopkeeper aborts the transaction.

If the voucher is genuine and if the data in hash H is genuine, then the shopkeeper hands over the amount Am to the receiver (640) (Procedure VI). (S→Rec: Am).

The shopkeeper can now send the PS voucher to the bank, if the bank wants to keep track of the PS vouchers (645). (S→B: PS voucher) (Procedure VII). Further, if there is any sort of dispute, then the shopkeeper uses the PS voucher to verify the authenticity of the transaction.

According to another exemplary embodiment of the present disclosure, it is possible to utilize a paper to cash model. Exemplary embodiments of the exemplary systems, methods and computer-accessible mediums can provide a protocol using PaperSpeckle that can enable people to handle physical cash transaction in a new and novel manner. This can be called "on/off cash" or "on demand cash" or "smart banknote."

Physical cash can be expensive to handle and transport. Extensive security measures can be in place in order to move large amounts of money around. In rural branchless banking, mobile banking and other agent based banking initiatives, the agent or the middleman may need to possess sufficient liquidity (e.g., cash) in order to meet the demand. Also, there can be a risk of money being stolen.

Using PaperSpeckle in one or more exemplary embodiments, it can be possible to mitigate and solve the aforementioned issues. First, the bank can provide cash with a speckle pattern S, corresponding speckle hash H and signs the hash H and value V using its private key. The bank disburses notes that can be "switched off" or deactivated, which means that the note has got no monetary value, unless it can be "switched on" or activated. The disabled notes can be available either for free or for really cheap prices in any grocery store.

Next, the cash can be "switched off" by default and can only be "switched on" using a cell-phone. The exemplary procedure to "switch on/off" can include the following.

When a client wants to withdraw certain amount from his account, for example V, he takes out the deactivated note whose value equals V and scans the speckle S to compute hash H. If $H_0$=H, then the note can be genuine. Using bank's public key, he can check if the value of the note is genuine. If the decrypted $V_0$=V, then the note can be of the same denomination. The client can send a message to the bank to activate the note. The bank can activate the note and $V amount of money can be debited from the client's account to that specific note. The note can now be a valid $V bill and the client can go to a shop to purchase any item.

During the transaction, the client can present an activated bill of value $V to the shopkeeper. The shopkeeper can verify if the bill is genuine or not He can scan the speckle S to compute hash H. If $H_0$=H, then the note can be genuine. Using bank's public key, he can check if the value of the note is genuine. If the decrypted $V_0$=V, then the note can be of the same denomination. The shopkeeper can send the bank a message, where the content of the message can be the hash H, requesting to deactivate the bill. The bank can deactivate the bill and credit the shopkeeper's account with $V.

To check whether a note or bill can be activated or deactivated, the hash H on the note can be sent to the bank. The bank can reply instantly if the bill can be activated or deactivated.

If a client wants to deposit money to his account, then he/she can simply use PaperSpeckle to verify the authenticity of the notes, that he has in his possession, and send hashes Hi, . . . , Hj to the bank as a message to deactivate the notes and deposit the amount that corresponds to notes Hi, . . . , Hj. The bank can deactivate the notes and deposit $V_i+ . . . +V_j$ in the client's account.

This type of on/off cash can be extremely useful in branchless banking settings. The advantages of this exemplary scheme can include the following:

When a note is deactivated, its value can be nil. Due to the value being nil, large amounts of deactivated cash can be moved/transported cheaply. Thus security or protection may not be needed.

Physical cash security can be a huge problem in rural branchless banking. The "on/off cash" scheme can overcome many problems of the use of physical cash. The shopkeeper or agent can deactivate all the cash that he accumulated during day the as deposits or loan repayments and can be worry-free about the security of cash.

Banks can send deactivated cash to the shopkeepers more often, and in cheaper ways, and not have to worry about robbery. The shopkeepers and agents can disburse loans more often and need not worry about maintaining liquidity.

Exemplary embodiments of the exemplary systems, methods and computer-accessible mediums can be used to authenticate both the security of the physical paper along with the user's identity. The exemplary protocol can be explained as follows:

The user's fingerprint can be put on the piece of paper.

The speckle images can be extracted from the region where the fingerprint can be present. The extracted speckle images can represent the region of the finger-printed data combined with the uniqueness of the underlying paper region.

Speckle image can be extracted from the predetermined regions and the compact code can be generated.

The Basic or Content verification primitive can be applied to the process to verify the authenticity of the paper and the user's identity.

Another exemplary process which can be used to authenticate both the paper and user's identity can be as follows:

The user puts their fingerprint on a piece of paper and the unique features of the fingerprint can be extracted.

The speckle image can be extracted from the predetermined regions of the fingerprint area and the compact code can be generated.

The fingerprint features and compact code can be combined to generate a string which can be a combination of the fingerprint features and the compact code.

The exemplary technique can facilitate and/or ensure that the fingerprint of the user can be verified as the features of the fingerprint and the compact code from the fingerprint can ensure that the paper can be authenticated.

Figure 7:
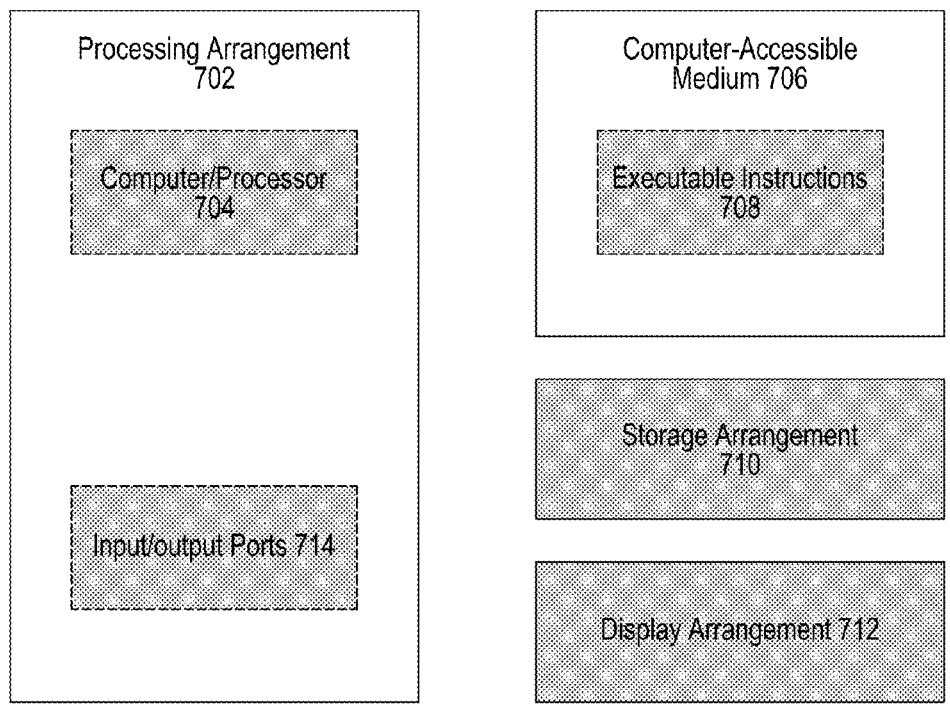
FIG. 7 is an illustration of an exemplary block diagram of an exemplary system in accordance with certain exemplary embodiments of the present disclosure.

FIG. 7 shows an exemplary block diagram of an exemplary embodiment of a system according to the present disclosure. For example, an exemplary procedure in accordance with the present disclosure can be performed by a processing arrangement and/or a computing arrangement 702. Such processing/computing arrangement 702 can be, e.g., entirely or a part of, or include, but not limited to, a computer/processor 704 that can include, e.g., one or more microprocessors, and use instructions stored on a computer-accessible medium (e.g., RAM, ROM, hard drive, or other storage device).

As shown in FIG. 7, e.g., a computer-accessible medium 706 (e.g., as described herein above, a storage device such as a hard disk, floppy disk, memory stick, CD-ROM, RAM, ROM, etc., or a collection thereof) can be provided (e.g., in communication with the processing arrangement 702). The computer-accessible medium 706 can contain executable instructions 708 thereon. In addition or alternatively, a storage arrangement 710 can be provided separately from the computer-accessible medium 706, which can provide the instructions to the processing arrangement 702 so as to configure the processing arrangement to execute certain exemplary procedures, processes and methods, as described herein above, for example.

Further, the exemplary processing arrangement 702 can be provided with or include an input/output arrangement 714, which can include, e.g., a wired network, a wireless network, the internet, an intranet, a data collection probe, a sensor, etc. As shown in FIG. 7, the exemplary processing arrangement 702 can be in communication with an exemplary display arrangement 712, which, according to certain exemplary embodiments of the present disclosure, can be a touch-screen configured for inputting information to the processing arrangement in addition to outputting information from the processing arrangement, for example. Further, the exemplary display 712 and/or a storage arrangement 710 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. In addition, all publications and references referred to above can be incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it can be explicitly being incorporated herein in its entirety. All publications referenced above can be incorporated herein by reference in their entireties.

Although an example computing system has been described in FIG. 7, implementations of the observer matter and the functional operations described in this specification can be implemented in other types of digital electronic circuitry, or in computer software, firmware, or hardware, including the structures disclosed in this specification and their structural equivalents, or in combinations of one or more of them.

Implementations of the invention and the operations described in this specification can be implemented in digital electronic circuitry, or in computer software, firmware, or hardware, including the structures disclosed in this specification and their structural equivalents, or in combinations of one or more of them. The invention described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that can be located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer can be a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the observer matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what can be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the observer matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A non-transitory computer-accessible medium having stored thereon computer-executable instructions for activating a paper as a financial instrument, wherein, when a computer hardware arrangement executes the instructions, the computer arrangement is configured to perform procedures comprising:
   electronically capturing at least one speckle pattern associated with at least one portion of the paper using an optical hardware arrangement;
   electronically generating information based on the at least one speckle pattern, wherein the information includes at least one speckle hash;
   authenticating the information to determine if the paper was issued by at least one financial institution;
   transmitting, over an electronic network, the at least one speckle hash;
   transmitting, over the electronic network, an electronic deposit of a particular amount of money into at least one account associated with at least one person at the at least one financial institution; and
   activating the paper as the financial instrument having a denomination based on the particular amount of money based on the at least one speckle hash.

2. The computer-accessible medium of claim 1, wherein the denomination is fixed.

3. The computer-accessible medium of claim 1, wherein the computer arrangement is configured to electronically authenticate the information by comparing the at least one speckle hash with at least one stored speckle hash.

4. The computer-accessible medium of claim 3, wherein the computer arrangement is configured to perform the authentication based on a similarity measure of at least one of (i) local or global descriptors or (ii) a Euclidean distance.

5. The computer-accessible medium of claim 1, wherein the information includes at least one low dimensional representation of the paper, and wherein the computer arrangement is configured to electronically authenticate the information by comparing the at least one low dimensional representation of the paper with at least one stored data of low dimensional representations based on a similarity measure of at least one of (i) local or global descriptors or (ii) a Euclidean distance.

6. The computer-accessible medium of claim 1, wherein the computer arrangement is configured to electronically activate the paper as the financial instrument by transmitting at least one message to the at least one financial institution.

7. The computer-accessible medium of claim 6, wherein the computer arrangement is configured to electronically transmit the at least one message using at least one of a mobile phone or an online portal.

8. The computer-accessible medium of claim 1, wherein the computer arrangement is further configured to electronically debit the at least one account based on the activation of the paper as the financial instrument.

9. The computer-accessible medium of claim 8, wherein an amount debited from the at least one account is based on the denomination assigned to the paper.

10. The computer-accessible medium of claim 1, wherein the computer arrangement is further configured to electronically:
receive further information related to the financial instrument;
authenticate the financial instrument using the further information; and
deactivate the financial instrument based on the authentication.

11. The computer-accessible medium of claim 10, wherein the further information includes at least one further speckle pattern associated with the at least one portion of the paper.

12. The computer-accessible medium of claim 10, wherein the further information includes at least one of the at least one speckle hash or at least one low dimensional representation of the paper; and wherein the computer arrangement is further configured to electronically compare the at least one speckle hash and the at least one low dimensional representation of the paper with at least one stored data of speckle hash values and at least one stored data of low dimensional representations based on a similarity measure of at least one of (i) local or global descriptors or (ii) a Euclidean distance.

13. The computer-accessible medium of claim 10, wherein the computer arrangement is further configured to electronically credit the at least one account based on the deactivation of the financial instrument.

14. The computer-accessible medium of claim 13, wherein an amount credited to the at least one account is based on the denomination assigned to the paper.

15. The computer-accessible medium of claim 13, wherein the denomination is variable.

16. The computer-accessible medium of claim 1, wherein the computer arrangement is further configured to:
transmit, over the electronic network, at least one of (i) a further electronic deposit of a particular further amount of money into the at least one account or (ii) an electronic withdrawal of the particular further amount of money from the at least one account; and
modify the denomination based on the at least one of the further deposit or the withdrawal.

17. The computer-accessible medium of claim 1, wherein the computer arrangement is further configured to electronically modify the denomination assigned to the paper based on at least one transaction associated with the financial instrument.

18. The computer-accessible medium of claim 1, wherein the computer arrangement is further configured to electronically encrypt the information using a private key of a trusted authority.

19. The computer-accessible medium of claim 18, wherein the computer arrangement is further configured to electronically decrypt the information using a public key of the trusted authority.

20. The computer-accessible medium of claim 1, wherein the optical hardware arrangement includes a microscope.

21. The computer-accessible medium of claim 1, wherein the computer-accessible medium is provided in at least one of a handheld computing device or a cell-phone attached to the optical hardware arrangement.

22. The computer-accessible medium of claim 1, wherein the computer arrangement is further configured to electronically extract the information from a user identity region of the paper.

23. The computer-accessible medium of claim 22, wherein the computer arrangement is further configured to electronically authenticate a user identity of the at least one person based on the information by comparing the at least one speckle pattern with at least one further speckle pattern.

24. The computer-accessible medium of claim 22, wherein the user identity region is a set of predetermined regions of at least one of a printed, an embedded, a written, a stained or a pasted user identity.

25. The computer-accessible medium of claim 22, wherein the user identity includes one or more fingerprints.

26. The computer-accessible medium of claim 22, wherein the user identity includes biometric data.

27. A method for activating a paper as a financial instrument, comprising:
electronically capturing at least one speckle pattern associated with at least one portion of the paper using an optical hardware arrangement;
electronically generating information based on the at least one speckle pattern wherein the information includes at least one speckle hash;
with a computer arrangement, authenticating the information to determine if the paper was issued by at least one financial institution;
transmitting, over an electronic network, the at least one speckle hash;
transmitting, over the electronic network, an electronic deposit of a particular amount of money into at least one account associated with at least one person at the at least one financial institution; and
electronically activating the paper as the financial instrument having a denomination based on the particular amount of money based on the at least one speckle hash.

28. A system for activating a paper as a financial instrument, comprising:
a computer arrangement which is configured to:
capture at least one speckle pattern associated with at least one portion of the paper using an optical hardware arrangement;
generate information based on the at least one speckle pattern, wherein the information includes at least one speckle hash;

authenticate the information to determine if the paper was issued by at least one financial institution;

transmit, over an electronic network, at least one speckle hash;

transmit, over the electronic network, an electronic deposit of a particular amount of money into at least one account associated with at least one person at the at least one financial institution; and activate the paper as the financial instrument having a denomination based on the particular amount of money based on the at least one speckle hash.

29. The computer-accessible medium of claim 1, wherein the paper is a paper speckle receipt.

30. The computer-accessible medium of claim 29, wherein the paper speckle receipt includes the at least one speckle pattern and at least one receipt code.

31. The computer-accessible medium of claim 30, wherein the computer arrangement is configured to determine if the paper was issued by the at least one financial institution based on the at least one speckle hash.

32. The computer-accessible medium of claim 31, wherein the paper has a fixed value, and wherein the computer arrangement is further configured to verify the fixed value based on the at least one speckle hash, the at least one receipt code and at least one value printed on the paper.

\* \* \* \* \*